(12) United States Patent
Kobayashi et al.

(10) Patent No.: US 6,767,214 B2
(45) Date of Patent: Jul. 27, 2004

(54) GENERAL LEARNING SUPPORT SYSTEM

(75) Inventors: Toshiya Kobayashi, Tokyo (JP); Hayato Honma, Kanagawa-ken (JP)

(73) Assignees: Honda Giken Kogyo Kabushiki Kaisha, Tokyo (JP); NTS, Inc., Yokohama (JP)

( * ) Notice: Subject to any disclaimer, the term of this patent is extended or adjusted under 35 U.S.C. 154(b) by 58 days.

(21) Appl. No.: 10/200,285

(22) Filed: Jul. 23, 2002

(65) Prior Publication Data

US 2003/0022145 A1 Jan. 30, 2003

(30) Foreign Application Priority Data

Jul. 26, 2001 (JP) ........................................ 2001/226845

(51) Int. Cl.[7] .............................................. G09B 7/00
(52) U.S. Cl. ...................... 434/322; 434/350; 434/362
(58) Field of Search ................................ 434/247, 322, 434/323, 350, 362

(56) References Cited

U.S. PATENT DOCUMENTS 6,039,575 A * 3/2000 L'Allier et al. ............. 434/323

FOREIGN PATENT DOCUMENTS

JP  2000-98865  4/2000

* cited by examiner

Primary Examiner—John Edmund Rovnak
(74) Attorney, Agent, or Firm—Westerman, Hattori, Daniels & Adrian, LLP

(57) ABSTRACT

The general learning support system comprises a preliminarily learning unit 50, an information providing unit 20, an input unit 53 and a post leaning unit 55. The preliminarily learning unit 50 provides, for preliminary learning, first information about a situation to be experienced by a learner. The information providing unit 20 provides second information to the learner who preliminary learned the first information by using the preliminary learning unit 50 such that the learner experiences the situation.

3 Claims, 3 Drawing Sheets

GENERAL LEARNING SUPPORT SYSTEM

BACKGROUND OF THE INVENTION

1. Field of the Invention

The present invention relates to a general learning support system. More particularly, the present invention relates to a system for supporting a learning in order to develop a self-talent through an experience.

2. Description of the Related Art

Conventionally, a learning support apparatus for supporting learning by using an information processor has been developed and served to practical use. For example, Japanese Laid Open Patent Application (JP-A 2000-98865) discloses a learning support system, and a teaching material server apparatus and a learner side apparatus which constitute the learning system, and a recording medium in which their programs are recorded.

According to this learning support system, when a plurality of teaching materials stored in a WWW server on the teaching server side apparatus are given to the learner through a client side apparatus, a study guidance function block of a learning program within the client side apparatus is used to generate a guidance on the basis of at lease one of link information based on a predetermined relation between teaching materials, a learning history with regard to the teaching materials for each learner, and evaluation information with respect to the teaching materials for each leaner, and then the guidance is provided to the learner.

Also, the teaching materials are systematically correlated in vertical and horizontal directions by classifying into, for example, a plurality of hierarchical trees and setting the link information for each hierarchy. The learner advances his or her learning while referring to the guidance and then pursuing the teaching materials systematically correlated to each other. Due to the above-mentioned configuration, the learner himself or herself can carry out the learning independently and systematically while groping and considering the learning method.

Recently, in a case of a business for using a vast place or land, for example, such as a circuit business, it is pointed that the place can not be effectively utilized only for the original business purpose. Thus, it is desired to attain the effective utilization of the place by collectively carrying out businesses besides the original business.

On the other hand, a new cumulative guidance record will be enforced in a recent future. In the new cumulative guidance record, an approximate time of several hours per year will be reserved as "General Learning Time". In the new cumulative guidance record, it is insisted to use this general learning time and carry out the general learning so as to feed an active ability. Therefore, the policy how to embody this general learning is required. Also, a time for a basic learning is reduced because of the introduction of the weekly two-holiday system, the time assigned to the general learning time and the like. Thus, a policy is requested for carrying out a high quality learning in a short time.

SUMMARY OF THE INVENTION

The present invention is accomplished in view of the above-mentioned background. Therefore, an object of the present invention is to provide a general learning support system that can attain an effective utilization of the place by carrying out a general learning in a vast place and can generally improve an individual ability through learning in a short time.

The general learning support system according to the present invention is installed in a vast place, for example, such as a circuit, and it includes a plurality of facilities such as a race place and a museum, and it supports a general learning by using a compound facility where nature can be experienced. Also, in this general learning support system, the learning in the aspect of the talent development becomes possible.

Means for achieving the object will be described below using reference numerals and symbols used in "Embodiments of the invention". These reference numerals and symbols are added so that relation between the description of "Scope of the Patent to be Claimed" and the description of "Embodiments of the invention" is made clear. However, it is never permitted to use the reference numerals and symbols for the interpretation of technical scopes of the inventions described in "Scope of the Patent to be Claimed" and the description of "Embodiments of the invention".

That is, in order to attain the above-mentioned object, the general learning support system according to the present invention comprises a preliminarily learning unit (50), an information providing unit (20), an input unit (53) and a post leaning unit (55). The preliminarily learning unit (50) provides, for preliminary learning, first information about a situation to be experienced by a learner. The information providing unit (20) provides second information to the learner who preliminary learned the first information by using the preliminary learning unit (50) such that the learner experiences the situation. The input unit is used by the learner to input the experience. The post leaning unit provides third information for post leaning to the learner based on said experience.

This general learning support system may further include a team classifying unit (52). The team classifying unit (52) classifies a plurality of the learners into teams in accordance with results of the preliminary leaning by using the preliminarily learning unit (50), wherein the second information is different between the teams classified by the team classifying unit (52).

Also, this general learning support system may further include a preliminarily evaluating unit (51) which evaluates the learner before the experience and a post evaluating unit (54) which evaluates the learner by comparing with a evaluation result of the preliminarily evaluating unit (51) after the experience.

DESCRIPTION OF THE PREFERRED EMBODIMENTS

Figure 1:
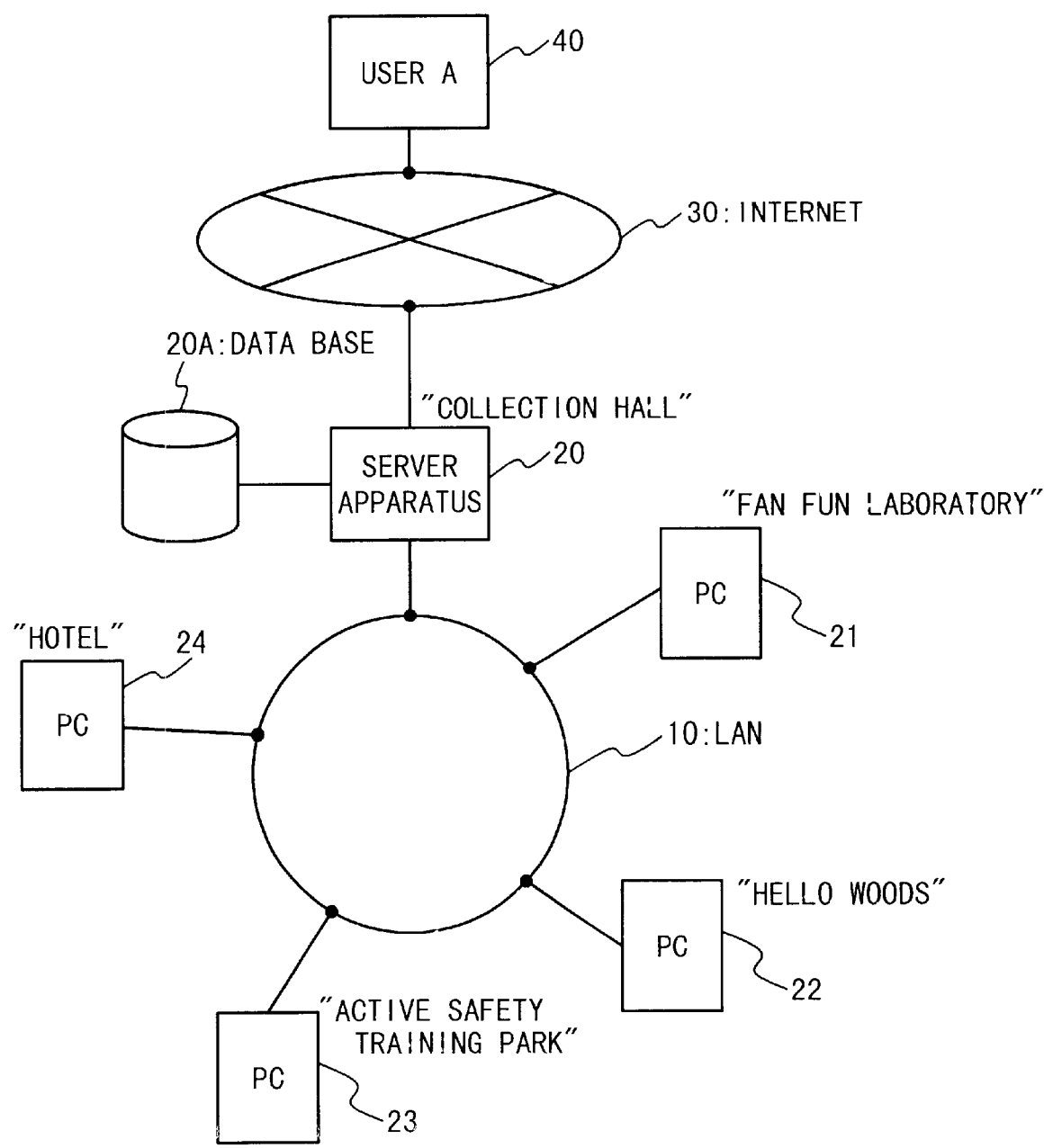
FIG. 1 is a block diagram showing a schematic configuration of a general learning support system according to an embodiment of the present invention.

A general learning support system according to an embodiment of the present invention will be described below with reference to the attached drawings.

At first, the schematic configuration of a learning program is explained which is carried out by using this general learning support system. It should be noted that this learning program is explained under an assumption that it is carried out by using a facility that is related to an automobile maker and built in natural environment. However, the present invention is not limited to this assumption.

In this learning program, it is assumed that "Collection Hall", "Fan Fun Laboratory", "Hello Woods", "Active Safety Training Park" and "Hotel", which scatter around a circuit, are used as the facility corresponding to an information providing unit of the present invention.

The "Collection Hall" introduces the history of the automobile maker, the change in a car and a motorcycle, the background of the births of the car and the motorcycle, and the drama of the persons in relation to the births, and the like. An orientation room is provided in this "Collection Hall" so that the learner can use it at any time.

The "Fan Fun Laboratory" is the research space where the learner studies a technique and a hint for solving the problems in relation to the car together with a researcher, and thinks about and finds out what they can do. This "Fan Fun Laboratory" includes an environment laboratory, a safety laboratory, a traffic laboratory, a NEXT laboratory, a factory laboratory and a manufacturing laboratory and the like. This "Fan Fun Laboratory" is designed such that the researcher and the learner can advance the program by using a learning game and a theater installed in everywhere.

The "Hello Woods" is constituted by a clubhouse and a field. The "Hello Woods" is the forest where they talk and think about the human existence through nature. A potter's wheel, a charcoal burner's lodge and a forest lavatory and the like are provided in the field, and they can be experienced. Also, country mountains can be experienced by walking around the filed while looking at trees, picking up fallen leaves, listening to voices of insects and birds and intently watching a small animal with bated breath. Also, in the clubhouse, the learning can be carried out by searching in the Internet or creating of a report or a craft.

In the "Active Safety Training Park", the learner can feel in the body the importance of a reception and a transmission of information and the importance of the obedience to a rule for functioning their processes, through the relationship between the car and the human. In this "Active Safety Training Park", the learner can experience a simple car assembly or learn a traffic safety classroom and the like. Moreover, the learner can experience the fact that the difficulty and the easiness with regard to communication is two sides of the same coin and the fact that the communication between humans is established in accordance with a tool based on a scientific technique, and the like.

The "Hotel" is naturally used for the staying of the learners, and it provides the Internet, a white board, a copy board, an OHP, a projector, a video set, a copier, drinking service and the like, as the learning environment. Also, in this "Hotel", the learner can experience the hotel works, such as reception work at a front, room service, bed making and the like.

As shown in FIG. 1, the general learning support system according to the embodiment of the present invention is composed of a server apparatus 20 and personal computers (PC) 21 to 24 which are connected to a local area network (LAN) 10, and the Internet 30 connected to the server apparatus 20.

The server apparatus 20 is installed in the "Collection Hall", and it manages this general learning support system. The server apparatus 20 stores the various kind of information used in the learning program. Then, the respective personal computers 21 to 24 can access the information at any time.

Also, this server apparatus 20 is connected to the Internet 30. This server apparatus 20 is designed so as to be able to access various sites through the Internet 30 or be accessed. For example, the server apparatus 20 can access respective computers of schools, teachers, students, children, respective homes, specialists, civilian organs, administrative organs and the like or be accessed, mutually. FIG. 1 shows an example in which a user A is connected to the Internet 30. Due to this configuration, the user A can send his or her learning policy or schedule to the server apparatus 20 and request the consideration with regard to the planning of the learning schedule and can pull out the information for a preliminary leaning and the like from the server apparatus 20. It should be noted that each of the personal computers 21 to 24 is designed so as to be able to access the Internet 30 through the local area network 10 and the server apparatus 20.

Figure 3:
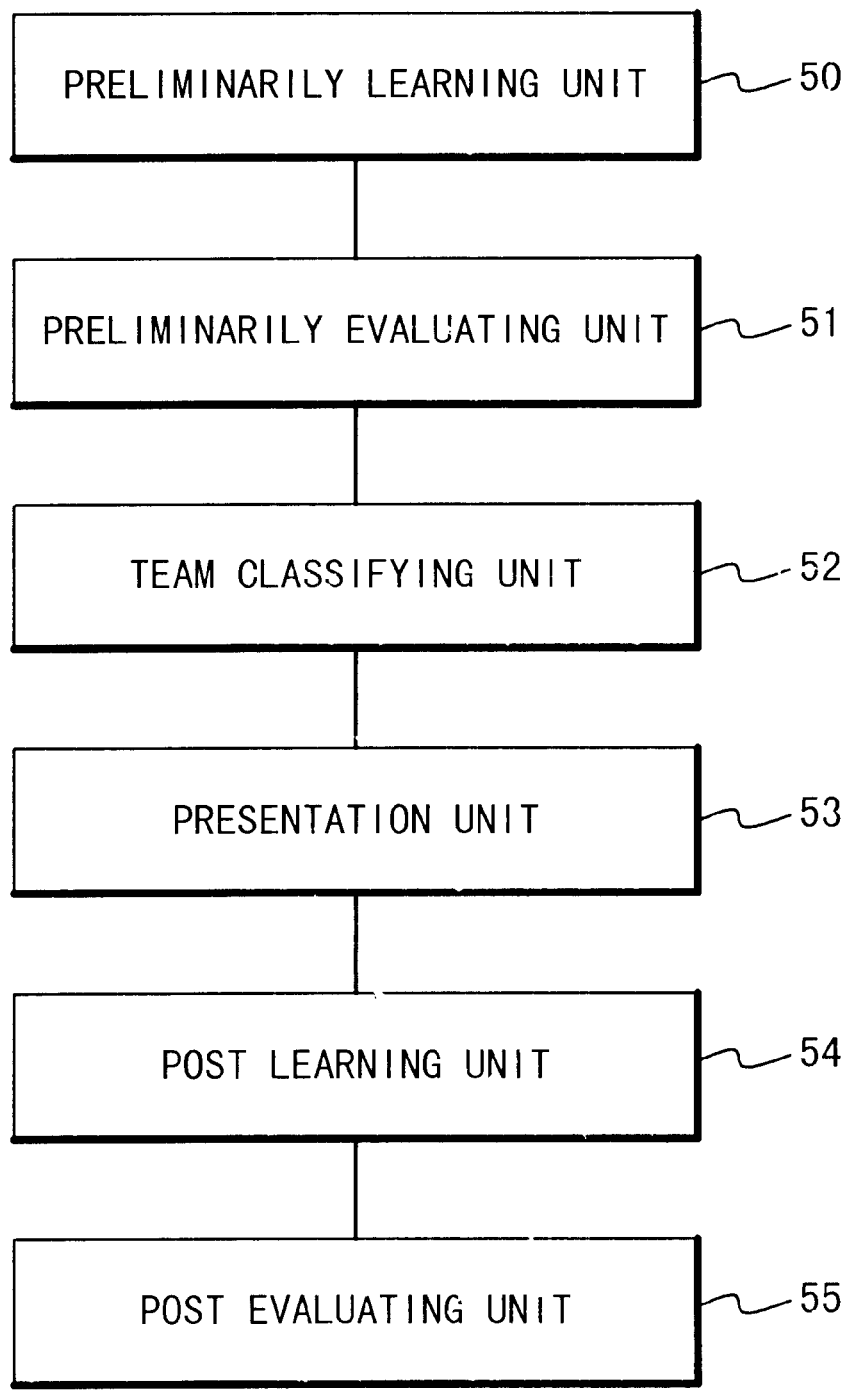
FIG. 3 is a view describing a structure of the server apparatus shown in FIG. 1.

This server apparatus 20, as described FIG. 3, includes a preliminarily learning unit 50 for supporting the preliminary learning of the learner (which will be described later in detail), a preliminarily evaluating unit 51 for preliminarily evaluating the learner, a team classifying unit 52 for classifying learners into teams in accordance with a result of the preliminary learning, a presentation unit 53 serving as a tool through which the learner expresses the experience result, a post learning unit 54 where the learner carries out the post learning based on the experience and a post evaluating unit 55 for post evaluating the learner. The presentation unit 53 corresponds to the input unit of the present invention.

A database 20a is connected to this server apparatus 20. The database 20a stores therein the data with regard to an individual learner. For example, this database 20a stores therein the result and the evaluation of the preliminary leaning of each learner, the various data generated in the middle of the experience learning and the result and the evaluation of the post learning, and the like. As necessary, the contents of this database 20a can be referred to from the personal computers 21 to 24 through the local area network 10 or from the user A through the Internet 30.

The personal computer 21 is installed in the "Fan Fun Laboratory". This personal computer 21 controls a learning game and a theater. Also, the personal computer 21 stores information of each laboratory. The learner can access this information at any time.

The personal computer 22 is installed in the "Hello Woods". The personal computer 22 can be used to make a report or a craft. Also, it is possible to access the Internet 30 through the local area network 10 and the server apparatus 20 from this personal computer 22 and thereby carry out various investigations.

The personal computer 23 is installed in the "Active Safety Training Park". This personal computer 23, for example, is used for the learning and training in the traffic safety classroom. The personal computer 24 is installed in the "Hotel". This personal computer 24 is used to access the Internet 30, prepare the OHP for a presentation and carry out other operations.

It should b noted that the above-mentioned example is designed such that the server apparatus 20 is installed in the "Collection Hall". However, the place where the server apparatus 20 is installed is not limited to the "Collection Hall", and it is arbitrary. Also, the above-mentioned example is designed such that the server apparatus 20 and the personal computers 21 to 24 are connected through the local area network 10. However, the network for the connection is not limited to the local area network. They can be connected through another network such as the Internet.

Next, the learning program carried out by using the general learning support system having the above-mentioned configuration will be described below according to the progress. This learning program is roughly composed of the preliminary learning, the experience learning and the post learning.

This learning program has the following purposes. The first purpose is to collect information and explore a problem. The second purpose is to recognize the importance of cooperation and methodology of the learning while enjoying team leaning. The third purpose is to cultivate the ability to solve the problem voluntarily and jointly by expressing the solution for the problem found out by the team.

Figure 2:
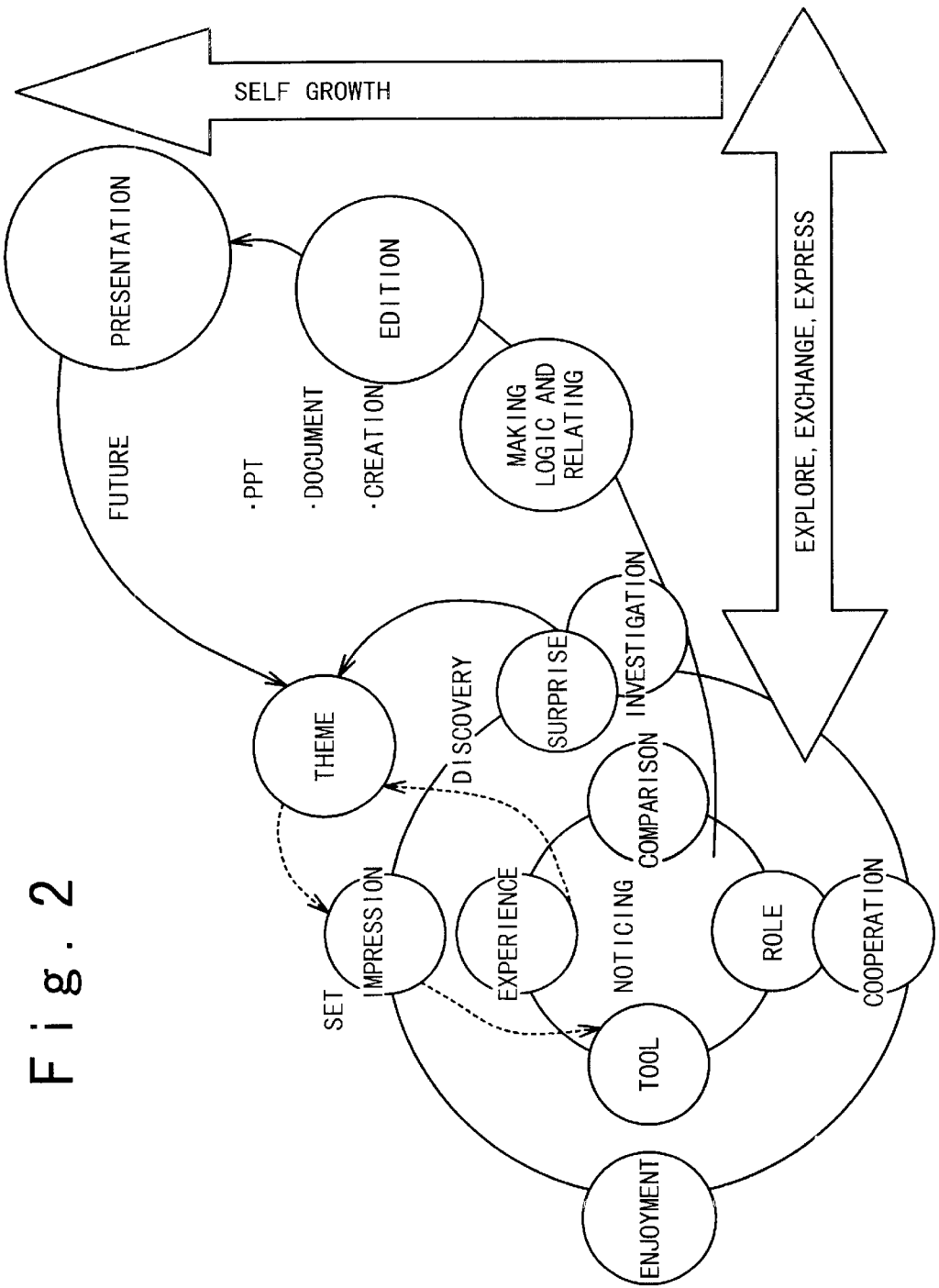
FIG. 2 is a view describing a concept of the general learning support system according to the embodiment of the present invention.

In this learning program, an experience, a comparison, a tool and a role are defined as basic frames, as shown in FIG. 2. Here, the experience leads to an impression, the tool leads to an enjoyment, the comparison leads to a surprise, and the assignment of the role leads to a cooperation. The learning is advanced in a cycle of investigating an element obtained from the basic frames, and making logic and relating them, and editing it, and finally carrying out the presentation.

An exhibition, a panel, a subject sheet, a data book, spreadsheet software, a word processor, a presentation tool and the Internet are used in addition to the above-mentioned facilities, as the tool. A comparison of a model change between a two-wheeled vehicle and a four-wheeled vehicle and a comparison between a sample X and another sample Y are carried out as the comparison target. Also, as the role, a predetermined role is assigned to each of a plurality of teams, an instructor, a researcher, a supervisor and a learning adviser, for the sake of a group dynamism type team learning.

The preliminary learning is firstly done in this learning program. That is, the learner joining this learning program accesses the server apparatus 20 through the Internet 30, and obtains the information necessary for a next experience learning and then carrying out the preliminary learning based on the information. This learning result is evaluated by the preliminarily evaluating unit 51 and used as the comparison information at the time of the post evaluation to be done after the experience learning. Then, the learner goes to the facility for the experience learning with the preliminarily learned experience.

As an example of the experience learning, such a case that the learner digests this learning program in a period of three days is described. It should be noted that the schematic period required to carry out the respective steps is jointly noted for reference. Also, at the following respective steps, the learner uses the spreadsheet software, the word processor and the presentation tool and accesses to the Internet, but these operations are carried out by using the server apparatus 20 and the personal computers 21 to 24. Thus, the explanation in the individual case is omitted.

A first step and an eleventh step as described below are carried out on the first day of the experience learning.

The first step is referred to as "Introduction" (10 minutes). At this first step, the flow of the learning is explained in an orientation room of the "Collection Hall". At this time, the importance of team learning and the importance of a possession of a self-viewpoint (a self-opinion) at a time of discussion or conversation are explained. After that, "Subject Sheet" is distributed to all learners divided into a plurality of teams.

The second step is referred to as "Experience" (30 minutes). At this second step, the learners of the team together with the learning advisor look over the exhibition and the panel, which are exhibited in the "Collection Hall". At this time, they walk around while making the conversation and the discussion, in order to prepare the solution as the team. The learning advisor does not urge the team to prepare the solution and intently watches the team so that a noise is not made. Also, the learning advisor urges the learner to ask the instructor a question.

The third step is referred to as "Dialog" (10 minutes). At this third step, the learners make the discussion in the orientation room. That is, they make the discussion with regard to the better solution as the team, and then prepare the solution.

The fourth step is referred to as "Presentation" (25 minutes). At this fourth step, the presentation of the team is carried out. A joyful point or a trouble point is expressed in this presentation. After the presentation of the team, the learners in the other teams precisely give applause.

The fifth step is referred to as "Exchange" (15 minutes). At this fifth step, the researcher explains the solution. Based on this explanation, it is confirmed that the exchange can be attained when the learners watch other exhibition panels while exchanging conversations with the friends under the possessions of their opinions without merely watching them.

The sixth step is referred to as "Evaluation" (20 minutes). At this sixth step, the degree of the cooperation provided by each team is calculated. At this time, the calculation is carried out on the basis of the correlation between a speed and a point. Which team provides the higher cooperation degree is confirmed. Also, as for the cooperation degree, the learning advisor evaluates retrospect of the team learning. It is confirmed that both of the improvement of the individual ability and the cooperation of the team are very important. Then, this sixth step is completed.

The seventh step is referred to as "Comparison" (40 minutes). At this seventh step, the difference of the model change in the design between the two-wheeled vehicle and the four-wheeled vehicle is discussed and expressed by each team. After that, the explanation is done by a designer. Then, the presentations are evaluated by the vote of all of the learners and the learning advisors.

The eighth step is referred to as "Jump" (40 minutes). At this eighth step, the beautifulness of the certain sample X is discussed and expressed by each team. Next, a sentence of FEYNMAN is introduced. Then, the presentations are evaluated by the vote of all of the learners and the learning advisors.

The ninth step is referred to as "Edition" (40 minutes). At this ninth step, the community of the sample X and the sample Y is discussed and expressed by each team. Then, one paragraph is introduced from "Mode System" written by ROLAND BARTHES. Then, the presentations are evaluated by the vote of all of the learners and the learning advisors.

The tenth step is referred to as "Preliminary Inspection after Classification of Teams" (2 hours). At this tenth step, the learner are classified into "Natural Group", "Scientific Group" and "Art Group" based on the previous steps. Then, the preliminary inspection is performed on the other facilities, namely, the "Fan Fun Laboratory", the "Hello Woods" and the "Active Safety Training Park" (each hall package program). Then, a supper is taken.

The eleventh step is referred to as "Subject Search" (90 minutes). At this eleventh step, a work in which each team searches for a theme is carried out in the "Hotel". At this time, the learners plan a summarizing manner with regard to the theme, a role assignment and an action schedule on a next day, while discussing the points noticed in the watching experience, namely, the preliminary inspection and researching through the Internet. The learning on the first day is ended as mentioned above.

The following first to third steps are carried out on the second day of the experience learning.

The first step is referred to as "Information Collection" (120 minutes). At this first step, an electromotive bicycle is used if the learner goes to each hall and again collects the information. The learning advisor checks whether or not the role assignment and the schedule are normally executed. In the "Hotel", the learner uses the Internet and further continues the investigation. At this time, the leaner, who arranges the investigated data in accordance with the previously determined role assignment, advances the arrangement works at the same time.

The second step is referred to as "Relation Logic" (120 minutes). At this second step, the relation figures of an event map and a meaning map are prepared on the basis of the arranged information. The relation figures are not used in the presentation. Thus, they may be rough sketches. The learning advisor should wait for them as much as possible, although he or she may give a hint. Next, a role assignment for an edition is determined.

The third step is referred to as "Edition" (240 minutes). At this third step, a theme, a sub theme, a summary and a story are prepared on the basis of the relation figures. At this time, the presentation tool is used to prepare the data for the presentation. Also, a document for disclosing at a homepage is prepared. A rehearsal is carried out after the completion of the above-mentioned preparations.

The first to third steps explained below are carried out on the third day of the experience leaning.

The first step is referred to as "presentation" (100 minutes). At this first step, the presentation for each team is carried out. At this time, clapping is given every time the presentation ends.

The second step is referred to as "Evaluation" (25 minutes). At this second step, the vote as to which team provides the excellent presentation is carried out. Furthermore, considering the results of the two days, the excellent team is announced. At this time, the leaning advisor is requested to comment about the reason why it is excellent, and the learner is also requested to comment about it.

The third step is referred to as "Problem Preparation Play" (180 minutes). At this third step, each team selects a favorite facility, and prepares three problems with regard to the facility. All of the problems are prepared to be select from five items. All hints for the problems must exist in the facility. Next, each team announces the prepared problems. The other teams answer the problems. A time for the consideration is one minute for each problem. Then, it is defined that the team preparing the many problems that can not be correctly answered gains the victory. The letter including the impression of the three days together with the prepared problems is sent to a director of the hall. Consequently, the program for the series of experience leaning is ended.

The post learning is carried out after the completion of the above-mentioned experience leaning. In this post leaning, the data is collected which is obtained when the learner answers a plurality of questions. Then, the post evaluation is carried out in accordance with the comparison with the result of the preliminary evaluation. It is used for the leaning, for example, in an education field.

As detailed above, in the general learning support system according to the present invention, the general learning support system can be provided that can use the vast place and carry out the general leaning to thereby attain the effective utilization of the place and can generally improve the individual ability through the leaning in a short time.

What is claimed is:

1. A general learning support system for facilitating learning by a plurality of learners, comprising:

a preliminarily learning unit which provides, for preliminary learning, first information about a situation to be experienced by said plurality of learners;

an information providing unit which provides second information to said plurality of learners who preliminary learned said first information by using said preliminary learning unit such that said plurality of learners experiences the situation;

an input unit by which said plurality of learners inputs said experience;

a post learning unit which provides third information for post learning to said plurality of learners based on said experience; and a team classifying unit which classifies said plurality of learners into teams in accordance with results of said preliminary learning by using said preliminarily learning unit.

2. The general learning support system according to claim 1, wherein said second information is different between said teams classified by said team classifying unit.

3. The general learning support system according to claim 1, further comprising:

a preliminarily evaluating unit which evaluates said plurality of learners before said experience; and a post evaluating unit which evaluates said plurality of learners by comparing with an evaluation result of said preliminarily evaluating unit after said experience.

* * * * *